(12) United States Patent
Kamiya et al.

(10) Patent No.: US 6,397,698 B1
(45) Date of Patent: Jun. 4, 2002

(54) CONTROLLING DEVICE FOR TRANSMISSION

(75) Inventors: Mitsutoshi Kamiya, Kariya; Takeshige Miyazaki, Anjo, both of (JP)

(73) Assignee: Aisin AI Co., Ltd., Nishio (JP)

( * ) Notice: Subject to any disclaimer, the term of this patent is extended or adjusted under 35 U.S.C. 154(b) by 0 days.

(21) Appl. No.: 09/642,812

(22) Filed: Aug. 22, 2000

(30) Foreign Application Priority Data

Sep. 1, 1999 (JP) ............................................. 11-246978

(51) Int. Cl.$^7$ ........................... F16H 59/04; F16H 63/38
(52) U.S. Cl. ................................ 74/473.11; 74/473.12; 74/473.18; 74/473.27
(58) Field of Search ........................... 74/335, 473.12, 74/473.11, 473.18, 473.21, 473.27, 473.28

(56) References Cited

U.S. PATENT DOCUMENTS

| | | | | |
|---|---|---|---|---|
| 4,377,951 A | * | 3/1983 | Magg et al. | 74/473.28 |
| 4,852,421 A | * | 8/1989 | Kerboul | 74/473.21 |
| 5,481,170 A | * | 1/1996 | Edelen et al. | 318/650 |

* cited by examiner

Primary Examiner—Allan D. Herrmann
(74) Attorney, Agent, or Firm—Burns, Doane, Swecker & Mathis, LLP

(57) ABSTRACT

The present invention intends to provide a controlling device for transmission in which locking action of the locking mechanism is not hindered by a part of the controlling device such as an actuator, when a fork shaft as an operating mechanism is held at a neutral position. For such purpose, the controlling device for transmission includes plural fork shafts, a selecting member selectively engaging with one of the fork shafts, a selecting actuator for moving the selecting member to engage with the fork shaft, a shifting actuator for applying load to the fork shaft engaged by the selecting member, and locking mechanism for locking the fork shafts. In such controlling device, the selecting actuator is constructed to move the selecting member to a non-engaging position not engaging with any of the fork shafts.

7 Claims, 6 Drawing Sheets

CONTROLLING DEVICE FOR TRANSMISSION

BACKGROUND OF THE INVENTION

1. Field of the Invention

This invention relates to a controlling device for a transmission, and more particular it relates to improvement of the controlling device for a manual transmission in which a predetermined speed-changing gear is selected by driving an operating mechanism with an actuator based on operation of a shifting lever and so on.

2. Related Background Art

A speed-changing mechanism (referred to as a "transmission" hereinafter) changes the ratio between the number of engine rotations and the number of wheel rotations to suitably transmit an output of the engine to the wheels corresponding to a running condition of the vehicle. A manual transmission performing speed-change based on the driver's manual operating is one example of such transmission. The manual transmission generally includes a gear portion selecting one of plural pairs of the speed-changing gears, an operating mechanism for operating the gear portion, and a controlling device for controlling the operating mechanism, although it includes minor differences depending on the type of transmission.

For example, the gear portion of five forward shifts and one backward shift type includes first to fifth speed-changing gears and a backward gear. The operating mechanism of the synchromesh-type includes first to third sleeves, and first to third paired synchronizer rings (referred to as "ring" hereinafter).

The controlling device includes, as shown in FIGS. 8 to 10, first, second and third fork shafts 71, 72 and 73 respectively supported by a transmission casing 80, a selecting member 78 to be engaged with one of three fork shafts, a shift actuator 81 for driving the fork shafts 71 to 73, a selecting actuator 76 for driving the selecting member 78, and a shifting lever 75 handled by a driver (in another type, a shifting switch (for example. button) is switched). Each of the fork shafts 71, 72 and 73 has at a lower portion of a tip end a fork (only 72a is shown) engaging with the fork engaging portion of the sleeve, and has an upper portion of the tip end a head portion 71b, 72b or 73b engaged by a fever portion 78b of the selecting member 78. At the rear part of the first, second and third fork shafts 71, 72 and 73. first, second and third locking mechanisms 86, 87 and 88 to be explained later are provided.

The fork shafts 71 to 73 and the selecting member 78 have been conventionally driven directly by the shifting lever 75. However, a hydraulic driving device or an electric motor controlled by a ECU etc. has been recently interposed between the fork shafts 71 to 73, and the selecting member 78 and the shifting lever 75. In this case, the shifting lever 75 functions as a shift commanding member to command the driver's intention for the speed-changing to the ECU. So, it can be comprised of switch member such as a button, instead of the shifting lever 75 shown in FIG. 8.

For example, an oil hydraulic actuator is used as the hydraulic driving device. As shown in FIGS. 9 and 10, a selecting rod 78 extending from a cylinder 77 of a selecting actuator 76 has a piston portion 78a at a rear end thereof, and is advanced/retraced by a pressured oil supplied to a cylinder 77 at both sides of the piston portion 78a. The selecting rod 78 has, at a tip end thereof, a lever portion 78b to be engaged with the head portion 71b, 72b or 73b. A shifting rod 83 extends in a crossing manner with a selecting rod 78 from a cylinder 82 of a shifting actuator 81 disposed to cross the selecting actuator 76. It has a piston portion 83a at a rear end, and has an engaging portion 83b engaging with the selecting rod 78 at the tip end.

With advancement/retraction of the selecting rod 77 by the selecting actuator 76 based on command of the ECU, the lever portion 78b of the selecting member 78 engages with one of the head portions 71b, 72b and 73b of the fork shafts 71, 72 or 73. Then, the selecting actuator 76 and one of the first to third fork shaft 71 to 73 engaged by the selecting member 78 are shifted integrally by the shifting actuator 81 based on the operating of the shifting lever 75. Thus, one of the first, second and third sleeves is shifted axially to select one of the speed-changing gears.

A first, second and third locking mechanism 86, 87 and 88 are provided for the first, second and third fork shafts 71, 72 and 73 respectively. These locking mechanisms 86 to 88 lock the fork shafts 71 to 73 and the sleeves at shifted positions thereof corresponding to shifting of the shift, locking them at the neutral position thereof corresponding to operation of the shifting lever 75. The locking mechanisms 86 to 88 are comprised of, as shown in FIGS. 9 and 10, three sets of semi-spherical hall holes 86a1, 86a2 and 86a3, 87a1, 87a2 and 87a3, and 88a1, 88a2 and 88a3 respectively formed at rear end of the fork shafts 71, 72 and 73; three halls 86b, 87b and 88b respectively pressed into the hall holes of each fork shaft: and three springs 86c, 87c and 88c respectively biasing the ball toward the corresponding ball holes.

The operating mechanism (the sleeves, the rings) are held at a leftward or a rightward position by moving the piston portion 83a near to the stroke ends of the shift actuator 81 via the fork shafts 71 to 73. For, example, when the sleeve etc. have been moved to the leftward position or the rightward position, the ball 87b is pressed into the ball hole 87a3 or 87a1 to hold the fork shaft 72 or the sleeve at the meshed position.

To the contrary, holding the sleeve etc. which have been shift-drawn out from the speed changing gear at the neutral position is not easy. For holding the sleeve etc. at the neutral position, they need to be positioned at a predetermined axial position or in extremely narrow allowable ranges located at both sides thereof. The sleeve etc. are held at the neutral position via the fork shafts 71 to 73 by holding the piston portion 83a at the axially neutral portion in the cylinder 82. However, the piston portion 83a can be hardly held at the neutral position even by regulating supply/discharge of the pressured oil. Thus, stopped position of the sleeve etc. may offset delicately in the axial direction of the cylinder 82.

For example, assume the piston portion 83a is offset in the cylinder 82 slightly leftward from the neutral position in the shift drawing-out of the second sleeve. In this case, the central ball groove 87a2 of the second locking mechanism 87 offsets slightly leftward from the position opposing the ball 87b. As a result, the ball 87b being drawn out from the ball hole 87a3 or 87a1 abuts a right edge of the ball hole 87a2 to apply a rightward biasing force F1 to the fork shaft 72. However, a sliding resistance F2 applied from the cylinder 82 to the piston portion 83a is larger than the biasing force F1. For this reason, the fork shaft 72 can not move rightward, stopping at a position offset slightly leftward from the neutral position. Thus, the locking mechanism 87 does not function to hold the fork shaft 72 and the sleeve at the neutral position. If vibration is applied to the transmission in this condition, the sleeve etc. are pressed to the speed-changing gears to be damaged and deteriorated.

When the central ball hole 87a2 of the second locking mechanism 87 is shifted slightly rightward from the position opposing to the ball 87b, the above mentioned members move in the direction reverse to the above direction. The above mentioned circumstances are similar for the first and third fork shafts 71 and 73.

Also, the engaging portion 83b of the shifting rod 83 engaging with the selecting rod 78, an engaging portion between head portions 72b etc. and the lever portion 78b of the selecting member 78, and distance between the head portions 72b etc. and the locking mechanisms 87 may have working and assembling errors. In this case, even if the piston portion 83a stops at the central position in the cylinder 82 in the shift drawing-out of the sleeve, the central ball hole 87a2 offsets leftward or rightward from position opposing to the wall 87b. As a result, problems similar to the above problem occur.

The above disadvantages of the conventional art may be overcome by controlling pressured oil supply to the cylinder 82 delicately and/or increasing working and assembling accuracies of the engaging portion 83b, the engaging portion between head portions 72b etc. and the lever portion 78b, and the distance between the head portions 72b and the locking mechanisms 87. However, delicate controlling of the pressured oil by the shifting actuator 81 and/or high accuracy working and assembling increase the manufacturing cost of the controlling device.

SUMMARY OF THE INVENTION

The present invention has been made in view of the above circumstances and intends to provide a controlling device for transmission in which the locking action of the locking mechanism is not hindered by a part of the controlling device (for example, a shifting actuator), when a fork shaft i.e. an operating mechanism is held at a neutral position. Here, movement of the operating mechanism in the transmission is controlled by the shifting fork of the controlling device, and the operating mechanism is locked at the neutral position, via the shifting fork, by the locking mechanism of the controlling device. The inventors of the present invention, as result of various studying, have hit on not applying the sliding resistance of an actuator moving in the same direction as the fork shaft to the fork shaft.

That is, the controlling device for transmission of the present invention includes plural fork shafts each having a fork engaged with an operating mechanism for speed-changing assembled into a gear portion of a transmission; a selecting member selectively engaging with one of the plural fork shafts; a selecting actuator for moving the selecting member to selected moved positions in a selecting direction so that the selecting member engages with the fork shaft setting a predetermined speed-changing shift; a shifting actuator for shift-moving the operating mechanism by applying an acting load to the fork shaft engaged by the selecting member; and locking mechanism for locking the plural fork shafts at a shifted position(s) and a neutral position corresponding to a shifting operation range of the operating mechanism.

In such controlling device for transmission, the selecting actuator is constructed to move the selecting member to a non-engaging position not engaged by any of the plural fork shafts.

In the controlling device for transmission of the present invention, after the sleeve is shift drawn-out from the speed-changing gear to the neutral position by the shifting actuator, the selecting member is moved by the selecting actuator to the non-engaging position where an engaging portion thereof does not engage with an engaged portion of any of the fork shafts. Thus, all of the fork shafts 71 to 73 can move axially without being applied sliding resistance. As a result, the fork shafts are locked by the locking mechanism at the neutral position thereof, which can avoid the operating mechanism from being held at the neutral position thereof pressed onto the gear portion.

According to the present invention, in the transmission in which the operating mechanism is operated by the shifting actuator based on operating of the shift commanding member such as the shifting lever, dimensional variation between the neutral position of the operating mechanism determined by the shifting actuator and the neutral position of the fork shafts determined by the locking mechanism provided for the fork shafts can be adjusted or removed. Such variation can be adjusted by releasing engagement between the fork shafts and the selecting member and holding the fork shafts and the operating mechanism at the respective neutral positions.

Next, various embodying modes of the present invention will be explained.

The gear portion of the transmission can be comprised of plural (three, for example) sets of paired speed-changing gears. The synchromesh-type operating mechanism can be comprised of plural sleeves respectively mounted on a main shaft axially movable but non-rotatable circumferentially, to set the main shaft and the speed-changing gear in an integrally rotatable state, and plural sets of paired rings to make the number of speed-changing gear rotations equal to the number of sleeve rotations.

The plural fork shafts of the controlling device can be disposed in one plane in parallel to each other, or along one circle in parallel to each other, to be moved axially. Each fork shaft has, at one end thereof, a fork engaging with the sleeve and an engaged portion engaged by the selecting member. The engaged portions are preferably aligned axially.

One selecting member has an engaging portion selectively engaging with one of the fork shafts. When the fork shafts are disposed in one plane in parallel, the selecting member can be disposed in the same plane orthogonal to them and movable axially. In this case, the selecting member selectively engages with one of the fork shafts by the engaging portion provided at a tip end thereof during the axial movement, and can assume the non-engaging portion located at one side of the selected moved positions aligned in one direction. Also, when plural fork shafts are disposed along the circle, the selecting member can be inserted into a hollow portion thereof to be operated. In this case, the selecting member selectively engages with one of the fork shafts at the engaging portion provided on an outer peripheral surface thereof during the rotation.

Here, the non-engaging position of the selecting member does not include the position of the selecting member where the engaging portion has disengaged from the preceding engaged portion but has not engaged with the succeeding engaged portion yet in the axial movement. At the non-engaging position, a dummy engaged member is preferably provided.

The selecting actuator moves the selecting member to one of the selected moved positions for causing it to engage with one of the shafts, and the non-engaging position for causing it not to engage with any of them. It can be constructed by a hydraulic driving device such as an oil hydraulic cylinder or an electric motor, both of which are controlled by a ECU controlled based on operation of the shift commanding member. For example, the oil hydraulic cylinder can be comprised of an inner cylinder in which a rear end of the selecting member is contained, an outer cylinder coaxially disposed with the inner cylinder, and a piston member disposed between the inner and outer cylinders and axially movable. The selecting member is moved to the selected moved position by controlling pressure within the inner cylinder in a moved state of the piston member in one direction, and is moved to the non-engaging position by controlling pressure within the inner cylinder in a moved state of the piston member in the other direction.

The electric motor can have an output shaft of which the rotated angle can be indexed. With fixing the selecting member on the output shaft, the electric motor can move the selecting member to the selected moved positions and the non-engaged position by indexing the rotated angle of the output shaft.

The shift commanding member can be the shifting lever actually shifted by the driver, or the switch such as a button not shifted but pressed by the driver. When the shifting lever is used, various shifting patterns can be adopted.

The shifting actuator is preferably comprised of an oil hydraulic cylinder controlled by a ECU based on operation of the shift commanding member. The shifting actuator sufficiently moves at least the fork shaft, which means it can move only the fork shaft or can move the selecting member and the selecting actuator together with the fork shaft.

The locking mechanism locks the fork shafts at the shifted positions and the neutral position. The neutral position can be located at one end of the shifted position, or at intermediate portion thereof. The locking mechanism can lock, at least when the selecting member is located at the non-engaging position, the plural fork shafts at the neutral position thereof. Also, the locking mechanism can lock, when the engaging portion engages with any of the engaged portion, the fork shafts with which the selecting member does not engage at the neutral position thereof. One locking mechanism can be provided for plural fork shafts, or plural locking mechanism can be provided corresponding to plural fork shafts.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

PREFERRED EMBODIMENT OF THE INVENTION

A preferred embodiment of the present invention will be explained with reference to attached drawings.

<First Embodiment>

A manual transmission of the first embodiment is comprised of a gear portion, operating mechanism and controlling device. The gear portion and the operating mechanism having the same construction as that in the conventional art are cited as occasion demands.

Figure 1:
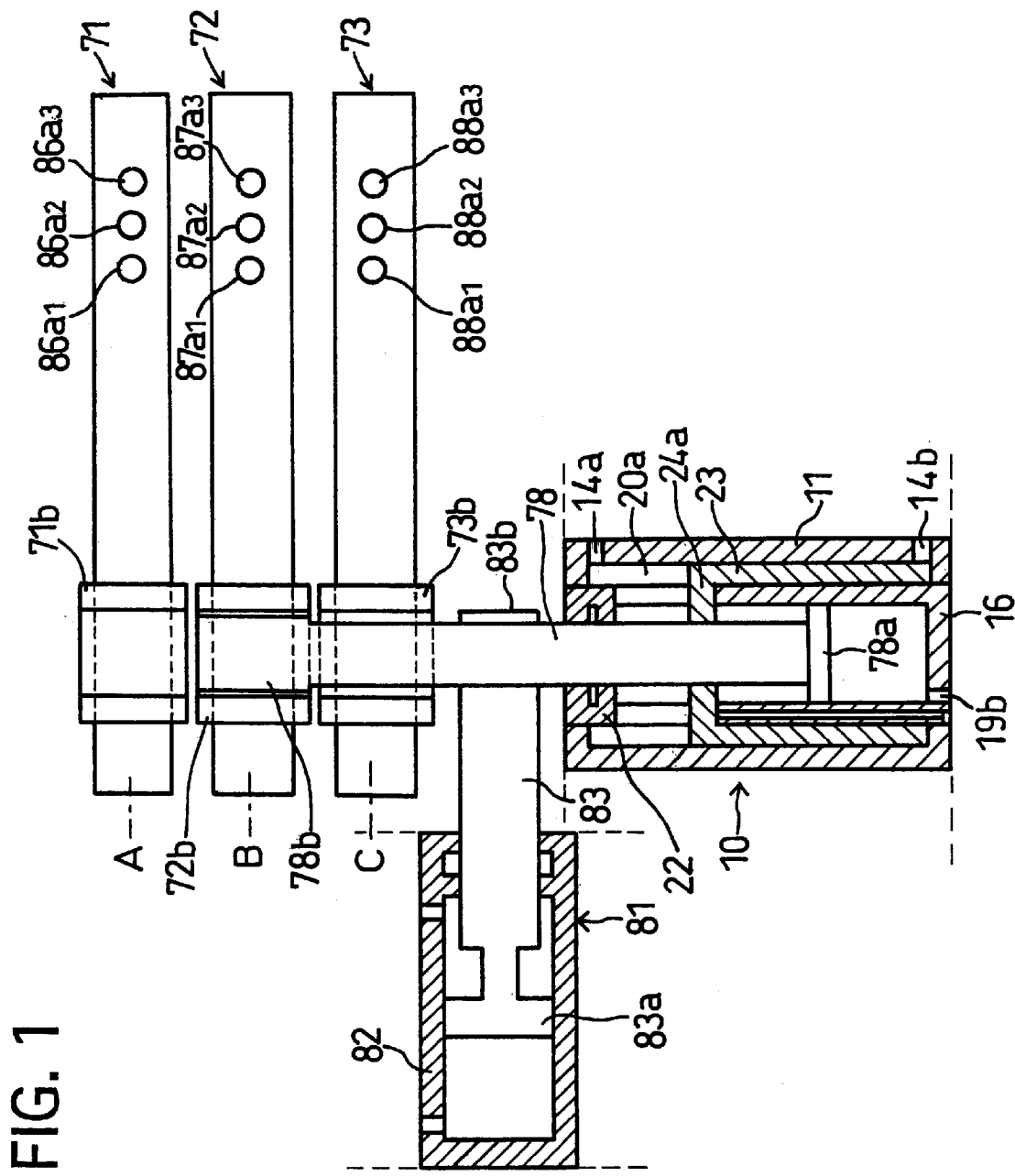
FIG. 1 is a front sectional view of a first embodiment of a controlling device for transmission of the present invention.
Figure 2:
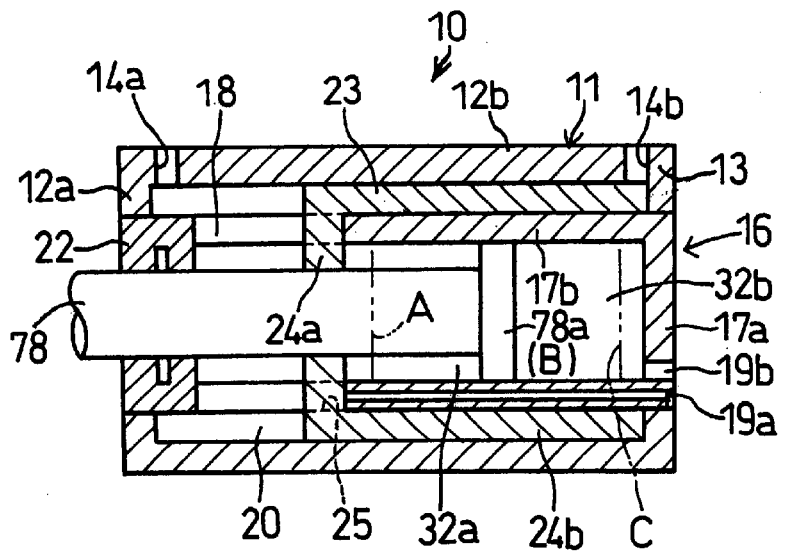
FIG. 2 is an enlarged view of a part of the controlling device shown in FIG. 1.
Figure 8:
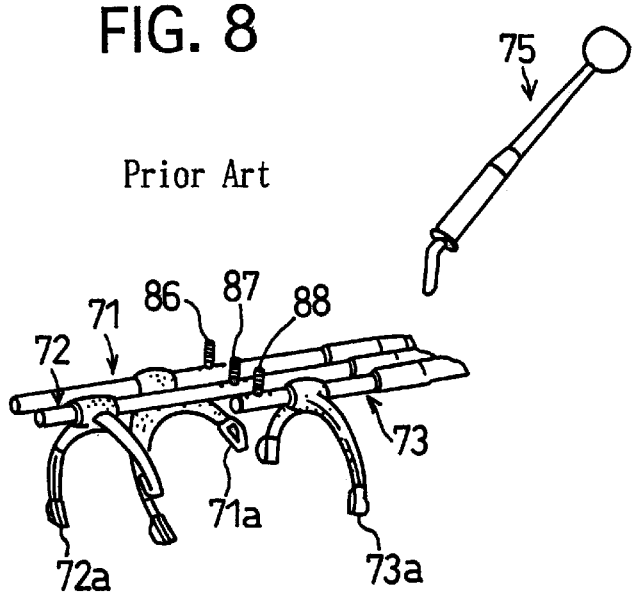
FIG. 8 is a perspective view showing part of an operating mechanism of a conventional transmission.

The controlling device is comprised of the plural shifting forks 71 to 73, a selecting member 78, a shifting actuator 81, a selecting actuator 10 shown in FIGS. 1 and 2, and the shifting lever 75 (refer to FIG. 8). The shifting actuator 81 having the same construction as the shifting actuator 81 is added the same reference numerals for the same part or element.

The selecting actuator 10 is comprised of an outer cylinder 11, an inner cylinder 16 disposed in the outer cylinder 11, a piston member 23 inserted between the outer cylinder 11 and the inner cylinder 16, and a selecting rod 78 extending from a hollow portion of the outer cylinder 11.

The outer cylinder 11 has a bottom portion 12a at one axial end (left end in FIG. 2) and an opened portion at other axial end, and is disposed with the bottom portion 12a facing toward the fork shafts 71 to 73. The opened portion has an inwardly directed flange portion 13. A cylindrical portion 12b is provided with, at portions near to the bottom portion 12a and the opened portion, radial pressured oil supplying ports 14a and 14b, respectively.

The inner cylinder 16 has at one end (right end in FIG. 2) a bottom portion 17a supported by the flange portion 13, and at other end an opened portion. The inner cylinder 16 has an axial length slightly shorter than that of the outer cylinder 11, so that an opened edge abuts onto a lid member 22 attached to the bottom portion 12a.

On the opened end of the inner cylinder 16, plural guiding protrusions 18 extending axially about one-third and spaced circumferentially are formed. The axial length of the guiding protrusions 18 is substantially equal to the interval between the adjacent fork shafts 71 and 72.

The inner cylinder 16 is provided with an axially extending port 19b on the bottom portion 17a, and a port 19a opened in a space (refer to FIG. 3) located between adjacent guiding protrusions 18. The outer diameter of the inner cylinder 16 is selected smaller than the inner diameter of the outer cylinder 11, so that an annular space 20 extending the whole length of the outer cylinder 11 is formed between the outer cylinder 11 and the inner cylinder 16.

The cylindrical piston member 23 has a bottom portion 24a at one end (left end in FIG. 2) and an opened end at the other end. A cylindrical portion 24b is contained in the annular space 20 and the bottom portion 24a has plural through-holes 25 allowing penetration of the guiding protrusions 18. Accordingly, the piston member 23 can move axially until the bottom portion 24a abuts the lid member 22 or until the opened edge abuts to the flange portion 13, relative to the outer cylinder 11 or the inner cylinder 16.

The piston member 23 has an axial length equal to that of the inner cylinder 16 except for the guiding protrusions 18, and equal to the interval between the first and third fork shafts 71 and 73. The piston member 23 divides the annular space 20 into left and right pressure chambers 20a and 20b.

The selecting rod 78 has at one end (lower end in FIG. 1) the piston portion 78a contained in the inner cylinder 16, and other end penetrating the bottom portion 24a and the lid member 22 and provided with a lever portion 78b. the piston portion 78a divides the inner space of the inner cylinder 16 into left and right pressure chambers 32a and 32b.

Figure 4:
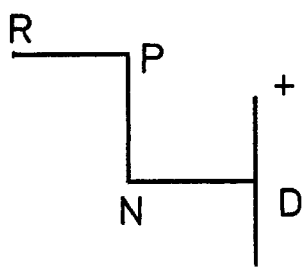
FIG. 4 is an explanatory view for showing a shifting pattern of a shifting lever.

The shifting actuator 81 and the selecting actuator 10 are controlled by the shifting lever 75 (refer to FIG. 8) having a shifting pattern shown in FIG. 4. The shifting lever 75 has a D-position, +-position, —position, N-position, P-position and R-position. It is shifted to the +-position in the shifting-up, and is shifted to the —position in the shifting-down.

Next, operation of the first embodiment will be explained.

Figure 9:
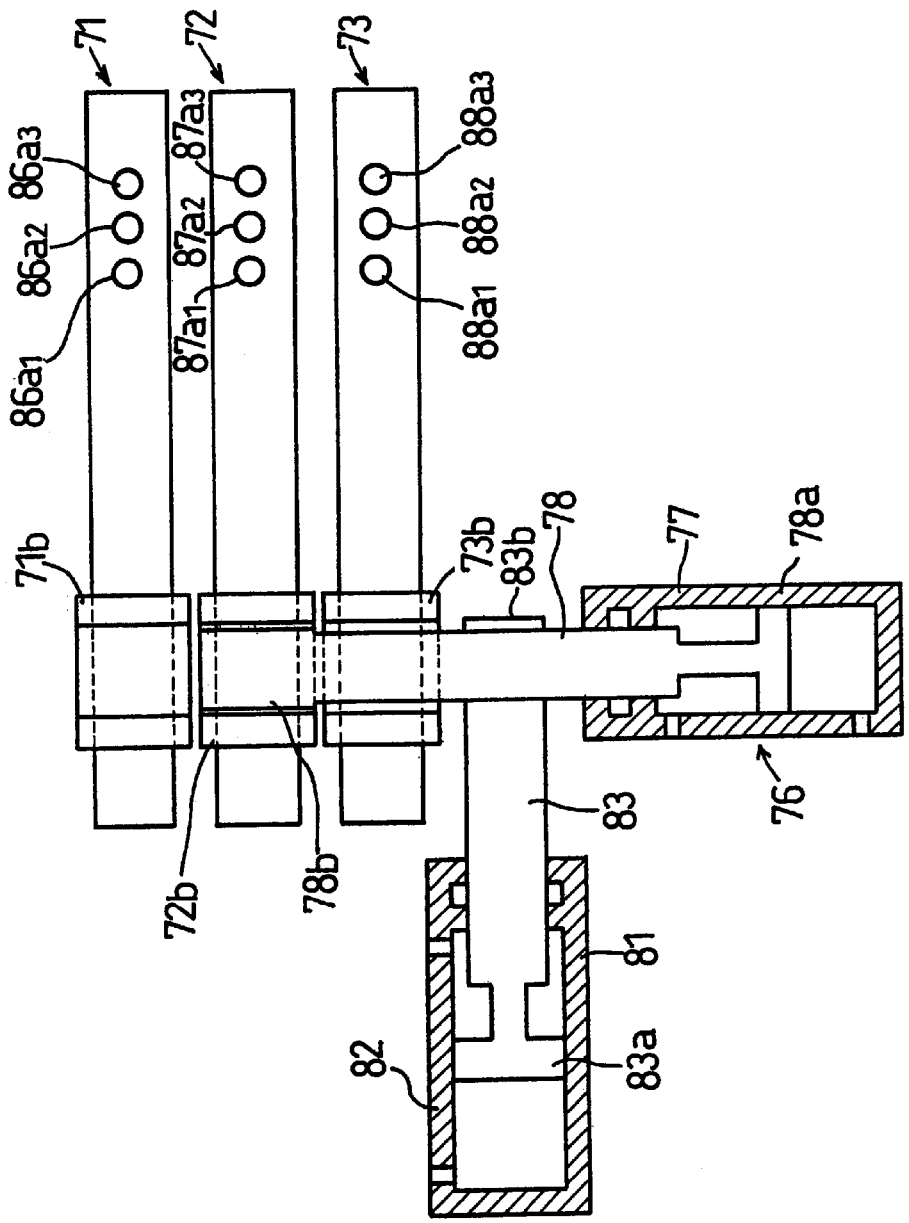
FIG. 9 is a plan view showing a conventional controlling device for transmission.
Figure 10:
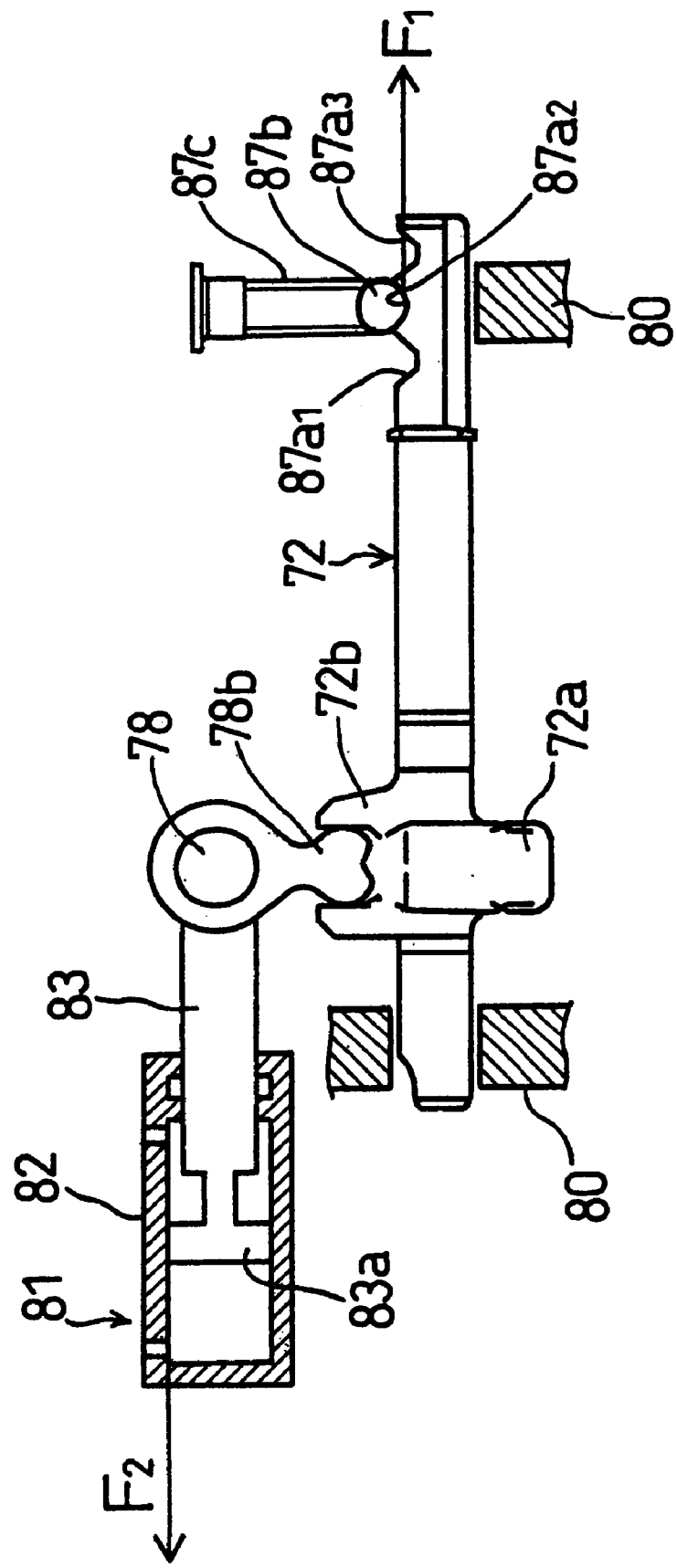
FIG. 10 is a sectional view of the controlling device shown in FIG. 9.

Assuming that the vehicle is running in the first speed-changing shift. In this condition, in the selecting actuator 10, the pressured oil is supplied through the port 14a into the pressure chamber 20a to move the piston member 23 to a retracted position (rightward position in FIG. 2). With the supply of pressured oil through the port 19b of the inner cylinder 16 into the pressure chamber 32b, as shown by position A in FIG. 2, the selecting rod 78 is advanced (moved upwardly in FIG. 1) until the piston portion 78a abuts the bottom portion 24a. In this position, the lever portion 78b engages, at the position A, with the head portion 71b of the first fork shaft 71 having advanced (moved rightward in FIG. 1) by the actuator 81. As a result, the ball 86b of the first locking mechanism 86 (refer to FIGS. 9, 10) engages into the left ball hole 86a1.

When the speed-changing shift is shifted up from the first-shift to the second-shift by the driver's intention, the shifting lever 75 is shifted to the +-position. Based on this shift, the first fork shaft 71 is retracted (moved leftward in FIG. 1) by the actuator 81. In this way, through engagement between the fork and the fork engaging portion, the first sleeve meshes with the second speed-changing gear, and the ball 86b of the first locking mechanism 86 engages into the right ball hole 86a3.

Here, the second and third fork shafts 72 and 73 capable of moving axially are held at the neutral positions thereof by the second and third locking mechanisms 87 and 88.

When the speed-changing shift is shifted up from the second-shift to the third-shift by the driver's intention, the shifting lever 75 is shifted to the +-position. Based on this shift, with the pressured oil being supplied through the port 19a of the inner cylinder 16 into the pressure chamber 32a as shown by position B in FIG. 2, the selecting rod 78 retracts to an axially intermediate position. As a result, the lever portion 78b engages with the head portion 72b of the second shifting fork 72. Then the second shifting lever 72 is advanced by the shifting actuator 81 so that the second sleeve meshes with the third gear via engagement between the fork and the fork engaging portion,. In this timing, the ball 87b of the second locking mechanism 87 engages into the left ball hole 87a1.

When the speed-changing shift is shifted up from the third-shift to the fourth-shift by the driver's intention, the shifting lever 75 is shifted to the +-position. Based on this shift, the second fork shaft 72 is retracted by the actuator 81. In this way, via engagement between the fork and the fork engaging portion, the second sleeve meshes with the fourth speed-changing gear, and the hall 87b of the second locking mechanism 87 engages into the right hall hole 86a3.

Here, the first and third fork shafts 71 and 73 capable of moving axially are held at the neutral positions thereof by the first and third locking mechanism 86 and 88.

When the speed-changing shift is shifted from the fourth-shift to the fifth-shift, the shifting lever 75 is shifted to the +-position. Based on this shift, with the pressured oil being supplied through the port 19a into the pressure chamber 32a, as shown by position C in FIG. 2, the selecting rod 78 retracts until the piston portion 78a abuts to the bottom portion 17a of the inner cylinder 16. As a result, the lever portion 78b engages with the head portion 73b of the third fork shaft 73. Then, the third shifting lever 73 is advanced by the shifting actuator 81 so that the third sleeve meshes with the fifth gear via engagement between the fork and the fork engaging portion. In this timing, the ball 86b of the third locking mechanism 88 engages into the left ball hole 88a1.

When the shifting lever 75 is shifted to the reverse-shift, the third fork shaft 73 is retracted by the shifting actuator 81. The third sleeve meshes with the reverse gear via engagement between the fork and the fork engaging portion. In this timing, the ball 88b of the third locking mechanism 88 engages into the right ball hole 88a3.

Here, the first and second fork shafts 71 and 72 capable of moving axially are held at the neutral positions thereof by the first and second locking mechanisms 86 and 87.

When the speed changing shift is shifted down, the shifting lever 75 is shifted to the —position. Based on this shifting, each member or element constituting the controlling device moves or operates in the direction reverse to the above direction. Thus, the speed changing shift is shifted down from the fifth-shift to the fourth-shift, from the fourth-shift to the third-shift.

Figure 3:
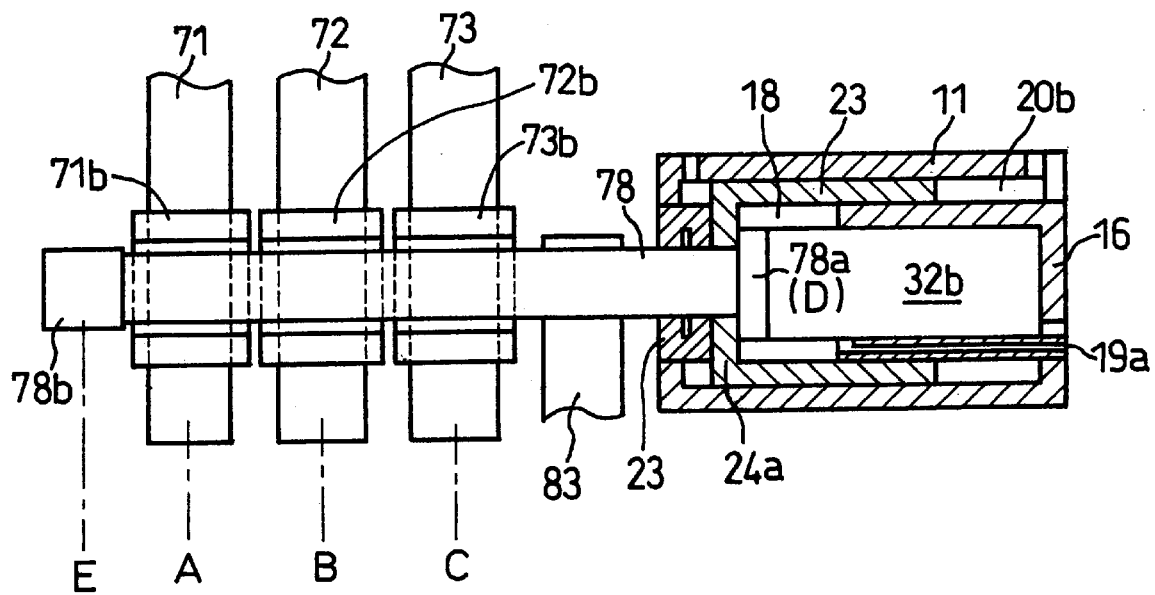
FIG. 3 is an explanatory view for explaining operation of the first embodiment.

Next, the operation of the controlling device when the command is for the N-position in FIG. 4 will be explained. When the first to the third shifting levers 71 to 73 are held at the neutral positions thereof for a long time, to prevent the sleeves etc. from being damaged, the pressured oil is supplied through the port 14b into the pressure chamber 20b, and the pressure oil is supplied through the port 19b into the pressure chamber 32b. As shown in FIG. 3, the piston member 23 advances (moves leftwardly in FIG. 3) by the pressured oil in the pressure chamber 20b until the bottom portion 24a abuts the lid member 22. As a result, the piston portion 78a is advanced by the pressured oil supplied to the pressure chamber 32b until it abuts the bottom portion 24a of the piston member 23 which has advanced. Thus, the selecting rod 78 further advances beyond the position A by a distance corresponding to the advanced amount of the piston member 23. As shown by a position E, the lever portion 78b has passed through the fork portion 71a of the fork shaft 71. In this condition, a gap is formed between the selecting rod 78 and the head portion 71b, 72b and 73b located at both sides thereof, which allows the fork shafts 71, 72 and 73 to shift axially.

In this condition, the first to third locking mechanisms 86 to 88 for the first to third fork shafts 71 to 73 operate. That is, the balls 86a to 88a engage in the hall holes 86b2 to 88b2 by the urging force of the spring 86c. For example, provided that the relative position between the ball 86a and the ball hole 86b2 is offset in one axial direction, the first fork shaft 71 is shifted axially by the urging force of the spring 86c until the ball 86 and the ball hole 86b2 coincide with each other. In this way, the first fork shaft 71 i.e. the first sleeve is held at the neutral position accurately by the locking mechanism 86.

The second and third locking mechanisms 87 and 88 operate in the same way. That is, provided that ball 87a or 88a and the ball hole 87b2 or 88a2 is offset, the second or third fork shaft 72 or 73 is shifted axially by the spring 87c or 88c until the ball 87 or 88 and the hall hole 87b2 or 88b2 coincide with each other. In this way, the second or third fork shaft 72 or 73 is held at the neutral position accurately by the locking mechanism 87 or 88.

In the first embodiment, the selecting actuator 10 is comprised of the outer cylinder 11, the inner cylinder 16 containing the piston portion 78a of the selecting rod 78 therein, and the movable piston member 23. By moving the piston portion 78a to one of three selected moved positions while having moved the piston member 23 to one (rear) axial end, the selecting rod 78 can engage with one of three fork shafts 71 to 73. Also, by moving the piston portion 78a to the non-engaging position while having moved the piston member 23 to the other axial end, the selecting rod 78 can advance to the non-engaging position. For such engagement/ disengagement between the selecting rod 78 and the fork shafts 71 to 73, the pressured oil supplied to the pressure chambers 20a and 20b is sufficiently controlled to control moving of the piston member 23, and the pressured oil supplied to the pressure chamber 32a and 32b is sufficiently controlled to control moving of the selecting rod 78.

Thus. the controlling device can, with simple oil pressure controlling in the selecting actuator 10 of a simple construction, realize a condition where the selecting rod 78 engages with one of fork shafts 71 to 73, and a condition where it does not engage with any of them easily and quickly.

In the first embodiment, the selecting actuator 10 is shifted together with the selected fork shaft 71, 72 or 73 by the shifting actuator 81. Alternately, only the selected fork shaft 71, 72 or 73 can be shifted by the shifting actuator 81, which can make the driving force and moving space for selecting actuator 81 unnecessary.

Figure 5:
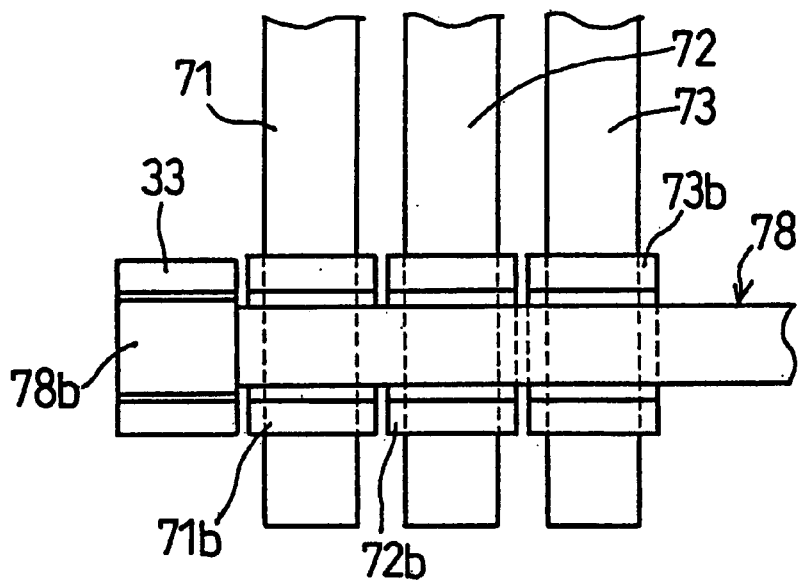
FIG. 5 is a front sectional view of a deformed example of the first, embodiment.

Further, as shown in FIG. 5, a dummy head portion 33 having the same construction as the above head portion 71b can be disposed adjacent to the first fork shaft 71, by attaching it to the transmission casing 80. The dummy head portion 33 can prevent the lever portion 78b protruding laterally from the fork shaft 71 from interfering with surrounding members or devices. Also, the gap formed between the selecting rod 78 and the head portion 71b allows the fork shaft 71 to shift axially.

<Second Embodiment>

Figure 7:
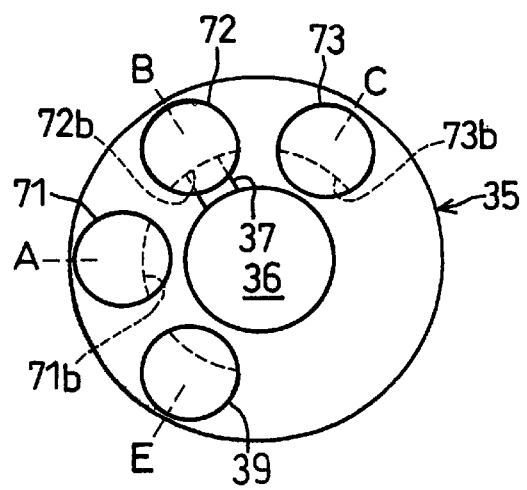
FIG. 7 is a side view of the second embodiment.
Figure 6:
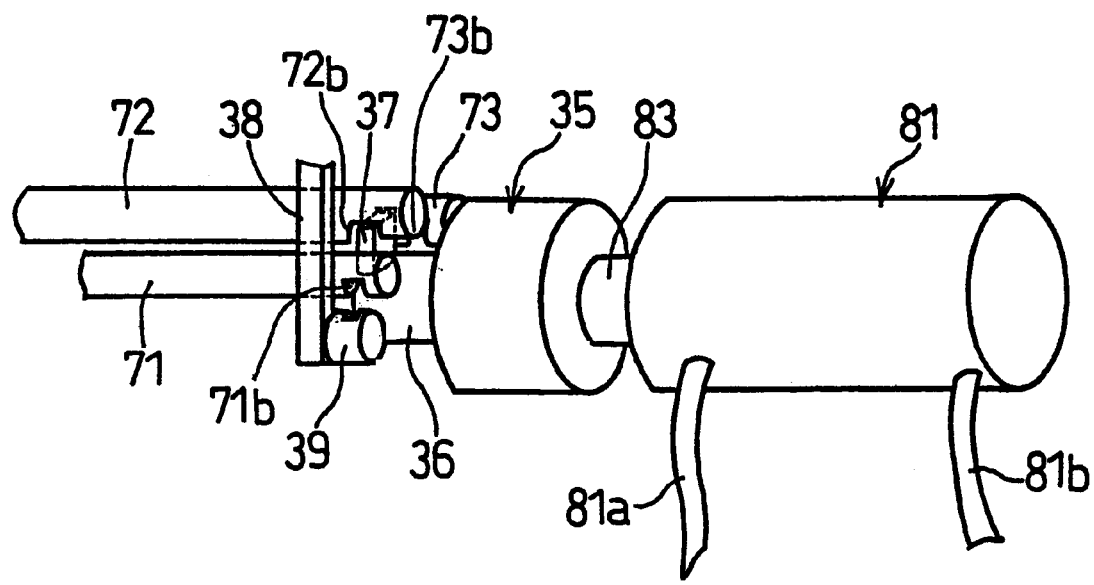
FIG. 6 is a front sectional view of a second embodiment of a controlling device for transmission of the present invention.

In the second embodiment shown in FIGS. 6 and 7, a selecting actuator 35 comprised of an electric motor has been disposed on the same axis as the shifting actuator 81 in series. In connection with this, the manner of arrangement of the fork shafts 71 to 73 has been altered.

In detail, the shifting actuator 81 is supplied the pressured oil at both axial ends thereof through the tubes 81a and 81b to advance/retract the shifting rod 83.

The electric motor 35 is mounted to the shifting rod 83, and a lever portion 37 protruding radially outwardly is formed on a selecting rod 36 fixed to an output shaft (not shown) of the electric motor 35. The rotating angle of the selecting rod 36 can be indexed in phases A, B, C and E shown in FIG. 7, so that the lever portion 37 moves circumferentially.

As apparent from FIG. 7, the first to third fork shafts 71 to 73 are arranged around the selecting rod 36 along a circle to be spaced circumferentially. Part of each fork shaft 71, 72 or 73 opposing the selecting rod 36 is recessed by predetermined length and depth to form a head portion 71b, 72b or 73b, respectively. These head portions are aligned in the axial direction of the fork shafts 71 to 73. A dummy head portion 39 is formed on a member 38 extended from the casing 80.

In the second embodiment, when the selecting rod 36 of the selecting actuator 35 rotates to the phase A based on operation of the shifting lever 75, the lever portion 37 engages with the head portion 71b of the first fork shaft 71.

Then, the shifting rod 83 is advanced/retracted by the shifting actuator 81.

On the other hand, the lever portion 37, being rotated to the phase B or C by the selecting actuator 35, engages with the head portion 72b or 73b of the second or third fork shaft 72 or 73. Then, the shifting rod 83 is advanced/retracted to move the second or third fork shaft 72 or 73 axially.

When one of the first to third fork shafts 71 to 73 is selected, one of the locking mechanisms 86 to 88 (refer to FIG. 1) corresponding to the selected fork shaft operates to lock it at the shifting position. On the other hand, if the command is for the neutral position N, the lever portion 37 is rotated to the phase E to engage with the dummy head portion 39. In this condition, the fork shaft 71 etc. can move axially, being locked at the neutral position by the locking mechanism 86 etc.

According to the second embodiment, the series arrangement of the shifting actuator 81 and the selecting actuator 35 makes the space for disposing them smaller. Further, the selecting rod 36 engages with one of the fork shafts 71 to 73 arranged circumferentially by being rotated by the electric motor as the selecting actuator 35, so that space for arranging the fork shafts 71 to 73 can be made smaller.

What is claimed is:

1. A controlling device for a transmission comprising:
   plural fork shafts each having a fork engaged with an operating mechanism for speed-changing assembled into a gear portion of a transmission;
   a selecting member selectively engaging with one of said plural fork shafts;
   a selecting actuator for moving said selecting member to selected moved positions in a selecting direction so that said selecting member engages with the fork shaft setting a predetermined speed-changing shift;
   a shifting actuator for shift-moving said operating mechanism by applying an acting load to said fork shaft engaged by said selecting member;
   locking mechanism for locking said plural fork shafts at a shifted position corresponding to a shifting operation range of said operating mechanism and a neutral position;
   said selecting actuator being constructed to move said selecting member to a non-engaging position not engaging with any of said plural fork shafts;
   said selecting actuator being constructed by a hydraulic device including an inner cylinder in which a rear end of said selecting member is contained, an outer cylinder disposed coaxially with the inner cylinder, and a cylindrical piston member disposed between the inner cylinder and the outer cylinder axially movable, said hydraulic device moving said selecting member to the selected moved-positions by controlling pressure of the inner cylinder with having moved the piston member in one end, and moving said selecting member to the non-engaging position by controlling pressure of the inner cylinder with having moved the piston member in other end.

2. A controlling device for a transmission according to claim 1, wherein, at the non-engaging position of said selecting member, a dummy engaged member with which said selecting member engages is provided.

3. A controlling device for a transmission according to claim 1, wherein said selecting member moves axially to engage with said plural fork shafts at a tip end thereof, and assumes the non-engaging position at one side of the selected moved positions aligned in one direction.

4. A controlling device for a transmission comprising:

plural fork shafts each having a fork engaged with an operating mechanism for speed-changing assembled into a gear portion of a transmission;

a selecting member selectively engaging with one of said plural fork shafts;

a selecting actuator for moving said selecting member to selected moved positions in a selecting direction so that said selecting member engages with the fork shaft setting a predetermined speed-changing shift;

a shifting actuator for shift-moving said operating mechanism by applying an acting load to said fork shaft engaged by said selecting member;

locking mechanism for locking said plural fork shafts at a shifted position corresponding to a shifting operation range of said operating mechanism and a neutral position;

said selecting actuator being constructed to move said selecting member to a non-engaging position not engaging with any of said plural fork shafts;

said selecting member moving by rotation, and engaging at a part thereof with said plural fork shafts disposed to surround said selecting member.

5. A controlling device for a transmission according to claim 4, wherein, at the non-engaging position of said selecting member, a dummy engaged member with which said selecting member engages is provided.

6. A controlling device for a transmission comprising:

plural fork shafts each having a fork engaged with an operating mechanism for speed-changing assembled into a gear portion of a transmission;

a selecting member selectively engaging with one of said plural fork shafts, a selecting actuator for moving said selecting member to selected moved positions in a selecting direction so that said selecting member engages with the fork shaft setting a predetermined speed-changing shift;

a shifting actuator for shift-moving said operating mechanism by applying an acting load to said fork shaft engaged by said selecting member;

locking mechanism for locking said plural fork shafts at a shifted position corresponding to a shifting operation range of said operating mechanism and a neutral position;

said selecting actuator being constructed to move said selecting member to a non-engaging position not engaging with any of said plural fork shafts;

said selecting actuator being constructed by an electric motor having an output shaft of which rotated angle is indexed and on which said selecting member is fixed, said electric motor moving said selecting member to the selected moved positions and the non-engaging position by indexing the rotated angle of the output shaft.

7. A controlling device for a transmission according to claim 6, wherein, at the non-engaging position of said selecting member, a dummy engaged member with which said selecting member engages is provided.

* * * * *